2,901,391
MODIFIED UREA-FORMALDEHYDE RESINS AND PAPER CONTAINING THE SAME

Lucius H. Wilson, Riverside, and Yun Jen, Stamford, Conn., assignors to American Cyanamid Company, New York, N.Y., a corporation of Maine No Drawing. Application June 15, 1954
Serial No. 436,998

17 Claims. (Cl. 162—167)

This invention relates to the manufacture of wet strength cellulosic webs. More particularly, the invention relates to cellulosic webs of improved wet strength composed of cellulosic fibers bonded together by a uniformly adsorbed content in thermo-cured form of certain quaternary ammonium modified urea-formaldehyde resins. The invention includes the resins mentioned and processes for the manufacture of the resins and the cellulosic webs.

The water-soluble condensation product formed by reacting urea wtih formaldehyde has long been known as one of the least costly synthetic resins and has been proposed as a resin useful for increasing the wet strength of the paper. While good results are obtained when the resin is applied by the tub method, in which preformed paper is impregnated with an aqueous solution of the resin this resin cannot be applied by the beater addition method wherein the resin is added to a dilute aqueous suspension of cellulosic fibers. Extensive experiments have proved that when urea is condensed with formaldehyde so as to obtain water-soluble products, the resin molecules thus formed are non-ionic and too small to be adsorbed by the cellulosic fibers. On the other hand, when the condensation is continued to form large molecules, the resin becomes hydrophobic and cannot be dispersed in water.

The discoveries have now been made that the resins formed by co-reacting urea, formaldehyde and a water-soluble quaternary ammonium compound having at least one aldehyde-reactive group (as hereinafter more fully described) are hydrophilic, colloidal, cationic and thermo-setting, and that paper of very satisfactory wet strength can be made by adding a small amount of these resins to an aqueous suspension of paper-making fibers, sheeting the fibers to form paper, and drying the paper at an elevated temperature in accordance with conventional paper-making practice. We have found that the resins are rapidly and substantively adsorbed by the fibers upon addition to the fibrous suspension, and that the drying times and temperatures normally employed in the manufacture of paper are sufficient to convert the resin to thermo-cured form, so that the fibers are bonded together by a content of water-insoluble polymerized resin.

The resins of the present invention may be prepared by a simple and direct procedure from known materials. They have a neutral pH, and are stable on storage. They are prepared for use in paper manufacture only by diluting with water, and it is unnecessary to adjust the pH of the resin or to age the resin before use.

The resins may be employed in the manufacture of paper by the "beater addition" or "tub" methods as may be desired according to the following general procedures.

When employing the resin according to the beater addition method, the resin solution, preferably diluted with water to 1%–5% resin content, is slowly metered into the fibrous suspension at any convenient point in the paper-making system ahead of the wire. The presence of alum in the suspension is unnecessary. Adsorption of the resin by the cellulosic fibers is rapid and is largely complete in a fraction of a minute. Curing of the resin takes place slowly at a pH above 7 and proceeds more rapidly as the pH is decreased. As a result, the pH of the fibrous suspension at the point of addition of the resin should be less than 7 and pH values of between about 4.5 to 5.5 permit the resin to be well adsorbed and rapidly cured.

The fibers are then sheeted to form paper, and the paper is dried. A satisfactory amount of curing takes place when the paper is dried by heating for only 2 minutes at the comparatively low temperature of 160° F. Better curing takes place as the temperature is raised and temperatures in the normal paper-making range of 210°–260° F. for the usual times of about ¼ to 4 minutes, as a practical matter, are entirely sufficient.

In the tub sizing method, the resin is diluted with water to a solids content of about 1%–5% and paper is impregnated or sprayed therewith at an acid pH. The paper is then dried as described.

The quaternary ammonium resins of the present invention may be manufactured by a number of procedures, all essentially equivalent in terms of results. Broadly, they are prepared by heating an aqueous solution of a 1:2 to 1:3 molar ratio urea:formaldehyde condensate having a viscosity of less than 1000 centipoises (measured at 45% solids and at 25° C.) with sufficient of a water-soluble quaternary ammonium compound having at least one aldehyde-reactive —$NH_2$ group to form a water-dispersible hydrophilic cationic resin having a viscosity between about 100 and 1000 cps. on the same basis. The reaction is terminated by cooling and the pH, if acid, is adjusted to neutrality.

The aforementioned general procedure may be specifically employed in three principal ways.

According to the first method, a monomeric or low molecular weight methylolated urea is formed by reacting 1 mol of urea with from about 2 to 3 mols of aqueous formaldehyde. This is conveniently done by heating the two at an alkaline pH until reaction of the formaldehyde is substantially complete. Some free formaldehyde may remain, and this is not harmful. The reaction mixture is then acidified and the quaternary ammonium compound added. The heating is continued at an acid pH until a resin is obtained having the described viscosity.

According to a second method, the urea and the formaldehyde are reacted at an alkaline pH as described and the low molecular weight syrup thus obtained is self-condensed at an acid pH, until a urea-formaldehyde resin is obtained having the viscosity mentioned above. The resin is then neutralized, stopping the self-condensation, and the quaternary ammonium compound added. The reaction is continued at an alkaline pH until substantially all of the quaternary ammonium compound has reacted with the resin. The end point occurs when the resin is converted into water-dispersible cationic form.

According to a third method, a reaction mixture is formed from the urea, the aqueous formaldehyde and the quatenary ammonium compound and the mixture is heated at an alkaline pH until reaction of the formaldehyde is substantially complete. The syrup is then acidified and the heating continued until the viscosity of the syrup has increased to within the range mentioned.

Only a minor amount of the quaternary ammonium compound is needed and this depends in each instance primarily upon the molecular weight of the compound, the number of quaternary ammonium groups and aldehyde-reactive groups therein, and the extent to which the acid condensation is allowed to proceed. As a result, this amount cannot be stated in numerical terms for each instance. The minimum effective amount, however, can readily be determined by laboratory trial as the amount should be at least sufficient to form a product which is hydrophilic, dispersing freely in water. In practice, we use at least 10% based on the weight of the free or combined urea present, this amount usually avoiding the danger of adding too little. The maximum effective amount to be added likewise varies from case to case for the same reasons, the result of an excess over that necessary being diminution of the bonding power of the resin as a whole. In practice, this maximum amount can readily be determined by laboratory trial, the presence of too much quaternary ammonium compound being evidenced by a decline in the wet strength of the paper. As a guide in this regard we have not yet found it desirable to employ more than 50% of the quaternary ammonium compound based on the weight of the free or combined urea present. Since the quaternary ammonium compound is normally the most costly component of the system we prefer to employ the minimum effective amount, that is, only that amount which is necessary to render the condensate hydrophilic, typically 20%–35% based on the weight of the free or combined urea present.

The reaction times, temperatures, and pH conditions are those which are familiar to manufacturers of modified urea-formaldehyde resins and therefore are not particular features of the present invention. For example, reaction temperatures between about 50° C. and reflux are suitable both under acid and alkaline conditions, but the range of 70°–85° C. is preferred as providing a rapid but controllable reaction. On the alkaline side the reaction in this temperature range usually takes 15 to 30 minutes and on the acid side, at pH 5, 20 to 40 minutes. The alkaline condensations are best controlled at pH values between about 7 and 9. The acid condensations, where the quaternary ammonium compound is present, may be run at a pH between 1 and 4–6. A pH in the range of 2–3 effects a reaction of satisfactory but not unduly great rapidity, and is therefore preferred. Where no quaternary ammonium compound is present during the acid reaction, as in the second method given above, the speed of reaction is advantageously moderated by employing a pH of about 4 to 6.

The extent to which the acid condensations referred to are allowed to proceed is critical.

In those methods of preparation wherein the quaternary ammonium compound is present in combined form, such as the first and second methods set forth above, the resin at termination of the reaction should have an average molecular size such that when assayed by laboratory trial it yields good wet strength paper. For a resin to act in this manner, it is usually necessary for the size of the resinous macromolecules to approach the colloidal range. At the other extreme, the reactions referred to should not be continued so that the final product passes into the hydrophobic stage in which it cannot be dispersed in water. As a practical matter, colloidal water-dispersible resins are generally obtained when the final syrup, adjusted to a solids content of 45% by weight at 25° C. has a viscosity between 100 and 1000 cps.

Where reaction of the quaternary ammonium compound is deferred until the acid reaction is completed, the urea-formaldehyde syrup, before addition of the quaternary ammonium compound, should have a viscosity within the range mentioned.

In selecting the particular method of preparation it should be noted that some quaternary ammonium compounds are often decomposed when heated at an alkaline pH. The first method of preparation is therefore preferred, which does not require subjecting the quaternary ammonium compound to alkaline heating.

The final resins are stabilized by adjusting their pH to neutrality and cooling. In that form they are stable and may be spray-dried to yield a powder from which a resin solution can be regenerated by dissolving the powder in water.

The quaternary ammonium compounds suitable for use in the manufacture of the resins of the present invention are those which are water-soluble and which contain at least one aldehyde-reactive —$NH_2$ group. Aldehyde-reactive —$NH_2$ groups are well-known as a class and include such groups as the amino group itself (—$NH_2$), the amido group (—$CONH_2$), the thioamido (or thiocarbamyl) group (—$CSNH_2$), the ureido group (—NH—CO—$NH_2$), the thioureido group (—NH—CS—$NH_2$), the guanyl group

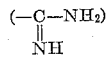

and the guanido group

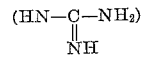

Quaternary ammonium compounds containing one or more of these radicals possess the capacity of condensing with dimethylolurea or similar reaction products at an acid pH. Typical examples of principal groups of such quaternary ammonium compounds are tripropyl 3-aminopropyl ammonium chloride made by reacting N,N-dipropylaminopropionitrile with propyl chloride followed by hydrogenation; trimethyl-2-amidopropyl ammonium chloride made by reacting β(dimethylamino) propionamide with methyl chloride; and trimethyl-2-ureidoethyl ammonium chloride formed by reacting 2-(dimethylamino) ethylamine first with potassium cyanate and then with methyl chloride. Potassium thiocyanate may be used in place of potassium cyanate to obtain the corresponding thio compound.

The quaternary ammonium compounds may be added in the form of their free bases or water-soluble salts as desired.

From the foregoing it will be seen that suitable quaternary ammonium compounds may be readily prepared by reacting dialkylamino, diarylamino, dialkarylamine, and diaralkylamino amides as such (or after reaction with an alkali metal cyanate or thiocyanate to convert the amide group or groups to ureido or thioureido groups) with a quaternizing agent, for example, an alkyl halide, an aryl halide, a heterocyclic alkyl halide including chloromethyloxazolidone, or an alkyl sulfate.

The substituents of the quaternary ammonium compound referred to may carry known substituents such as epoxy groups, hydroxy groups, or amino groups. Amino groups may be introduced by employing epichlorohydrin as the quaternizing agent, and reacting the epoxy group of the glycidyl radical thus introduced with ammonia or an amine. The alkyl groups referred to may be of any length and the ratio thereof to any aryl groups present need only be such that the quaternary ammonium compound as a whole is water-soluble. The particular substituent radicals attached to the quaternary ammonium atom are thus not particular features of the invention, and numerous other quaternary ammonium compounds having at least one aldehyde-reactive —$NH_2$ group may be formed by those skilled in the art.

In the specification the term "aldehyde-reactive —$NH_2$ group" is employed to designate any group such as amino, carboxamido, thioamido, guanyl, guanido, ureido, and thioureido which are capable of forming a methanol derivative when refluxed with formaldehyde at an alkaline pH. It is known that —$NH_2$ groups capable of this reaction will also react with dimethylolurea and similar condensates at an acid pH.

The invention will be further described by the examples which follow. These examples will be embodiments of the invention and are not to be construed as limitations thereon. Parts are by weight unless otherwise stated.

Example 1

Glycidyl dimethyl 3-ureido-propyl ammonium chloride having the theoretical formula

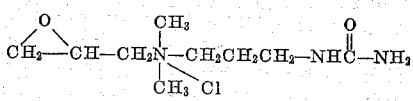

was prepared as follows.

One-half mol of 3-(dimethylamino)propylamine was diluted with 139 g. of water and chilled on an ice bath. 95 g. of 37.5% HCl was added slowly, the temperature being maintained below 10° C. The product was cooled to −10° C., 0.5 mol (45.0 g.) of 93% KCNO added, and the reaction mixture allowed to warm to room temperature. After effervescence had subsided the reaction mixture was refluxed for 15 minutes. The product was converted to the free base by addition of aqueous sodium hydroxide and concentrated on a steam bath to 100 ml. 400 ml. of methanol was then added and the mixture cooled to precipitate potassium chloride. The mixture was then filtered and the filtrate vacuum concentrated to about 100 ml. The precipitation procedure was repeated. The viscous water-white was soluble in water. 29 g. of the product was mixed with 20 g. of epichlorohydrin in 150 g. of benzene and allowed to stand several days, during which quaternization took place. The product was extracted from the benzene with water.

Example 2

Glycidyl di-2-hydroxyethyl 3-ureidopropyl ammonium chloride was prepared as follows.

Two mols (334 g.) of 97% bis(2-hydroxyethylamino)propylamine was reacted with 196 g. of 91% KCNO and 390 g. of 36.9% HCl in 196 g. of water for 3 hours at 80° C. The solutions were filtered. The filtrate was made alkaline with NaOH, mixed with an equal volume of ethanol and additional salt filtered off. The filtrate was concentrated under vacuum. The product was mixed with 28 g. of epichlorohydrin and 89.5 g. of demineralized water and allowed to stand 24 hours.

Example 3

A wet strength resin was prepared as follows.

Methanol-free formaldehyde (2.5 mols) buffered at about pH 7.3 with triethanolamine and 1 mol of urea was heated at 75° C. for 30 minutes and then acidified to pH 2.7 with HCl. Heating was continued until the syrup reached a viscosity of 225 cps. measured at 45% solids and 25° C., and then neutralized with dilute NaOH and cooled. The glycidyl dimethyl 3-ureidopropyl ammonium chloride of Example 1 was added in amount equal to 32% of the weight of the urea taken for reaction with the formaldehyde and the mixture allowed to stand at room temperature until reaction was complete.

Example 4

A second wet strength resin was prepared by the method of Example 3 except that the glycidyl di-2-hydroxyethyl 3-ureidopropyl ammonium chloride of Example 2 was employed in amount equivalent to 30% of the urea in the syrup in place of the glycidyl dimethyl 3-ureidopropyl ammonium chloride.

Example 5

A third wet strength resin was prepared as follows. Chloromethyloxazolidone

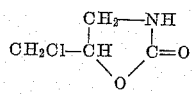

was made by refluxing 100 g. each of 93% KCNO and epichlorohydrin, 60 g. of calcium hydroxide and 500 g. of demineralized water for two hours followed by filtration hot to remove calcium chloride, chilling, filtration, and recrystallization from water of the crystals thus obtained.

One mol of urea was dissolved in 2.5 mols of 37% methanol-free formaldehyde buffered at pH 7.3 with triethanolamine. The mixture was heated to 75° C. for 30 minutes. Triethylenetetramine and chloromethyloxazolidone were added in amounts respectively equivalent to 10% and 5% of the weight of urea taken.

The pH of the resin solution was then adjusted to 2.7 with HCl and heating continued until the viscosity of the syrup measured at 45% solids and 25° C. reached 225 cps. The syrup was then neutralized with aqueous NaOH and cooled.

Example 6

Wet strength paper was made by use of the resinous syrups of Example 3, 4, and 5 as follows.

Bleached kraft pulp beaten to a Green freeness of 500 ml. was diluted to 0.6% consistency and aliquots withdrawn. The resinous syrups, diluted to 2% solids with water, were added with stirring in amounts shown in the table below. The suspensions were immediately adjusted to pH 4.5, gently stirred for 15 minutes, and sheeted on a Nash handsheet machine. The wet sheets were pressed between blotters and felts on a Noble-Wood handsheet press using full pressure and dried in contact with one blotter on a Paragon drum dryer. Certain sheets were given a light cure (two minutes at 160° F.) to determine the wet strength imparted at this very low temperature, and the remaining sheets were given a normal cure (two minutes at 240° F.). The handsheets were conditioned at 73° F. and 50% relative humidity for at least 24 hours and their wet strength determined. Results were as follows.

| Resin Added | | Sheet Basis Wt.[2] | Tensile Strength (Lb. per inch) | | | |
|---|---|---|---|---|---|---|
| | | | Light Cure [3] | | Normal Cure [4] | |
| Example | Percent [1] | | Dry | Wet | Dry | Wet |
| Control | Nil | 46.4 | | 0.4 | 25.0 | 0.4 |
| 3 | 1.0 | 47.3 | 29.9 | 3.4 | | 5.9 |
| 4 | 1.0 | 48.7 | 29.9 | 2.0 | 31.5 | 5.9 |
| 5 | 1.0 | 47.0 | 27.9 | 3.7 | | 6.3 |

[1] Total solids in resin dispersion based on dry weight of fibers.
[2] Lb. per 25″ x 40″/500 ream.
[3] Two minutes at 160° F. without blotter.
[4] Two minutes at 240° F. with blotter.

The results show that very good wet strength was obtained when the paper was given a normal cure, and that a wet strength adequate for many purposes was imparted when the paper was dried at about the minimum commercially practicable temperature.

We claim:

1. A process for the manufacture of a wet strength cellulosic web which comprises contacting cellulosic fibers with a dilute aqueous dispersion of a hydrophilic colloidal cationic thermo-setting resin formed by acid reaction of a methylol urea with a water-soluble quaternary ammonum salt having one aldehyde-reactive —NH$_2$ group, thereby depositing from about 0.1% to 5% of said resin on said fibers based on the dry weight thereof, and heating said fibers at an acid pH at a temperature between about 160° F. and 260° F. for about ¼ to 4 minutes to dry the fibers and form a bond of cured resin therebetween.

2. A process according to claim 1 wherein the dilute aqueous resin dispersion has a pH between about 4.5 and 5.5.

3. A process according to claim 1 wherein from about 1% to 3% of the resin is deposited on the fibers.

4. A process for the manufacture of a wet strength cellulosic web which comprises forming an aqueous suspension of cellulosic fibers, adding thereto from about 0.1% to 5% based on the dry weight of the fibers of a hydrophilic colloidal cationic thermo-setting resin formed by acid reaction of a methylol urea with a water-soluble quaternary ammonium salt having one aldehyde-reactive $-NH_2$ group, sheeting the suspension at an acid pH to form a web, and heating the web between about 160° F. and 260° F. for about ¼ to 4 minutes to dry the web and to form a bond of cured resin between the fibers thereof.

5. A process according to claim 4 wherein the pH of the aqueous fibrous suspension is between about 4.5 and 5.5 on addition of the resin.

6. A process according to claim 4 wherein the amount of resin added is between about 1% and 3% of the dry weight of the cellulose fibers.

7. A process according to claim 4 wherein the quaternary ammonium salt is a trialkyl-2-amidoethyl ammonium chloride.

8. A process according to claim 4 wherein the quaternary ammonium salt is a trialkyl-2-ureidoethyl ammonum chloride.

9. A process according to claim 4 wherein the web is heated between about 210° F. and 260° F. for ¼ to 4 minutes.

10. A process for the manufacture of a resin syrup which comprises reacting an aqueous 1:2 to 1:3 molar ratio urea:formaldehyde condensate having a viscosity of less than 1000 centipoises when measured at 45% solids and a temperature of 25° C. with sufficient of a water-soluble quaternary ammonium compound having one aldehyde-reactive $-NH_2$ group to form a hydrophilic, colloidal resin syrup having a viscosity between about 100 and 1000 centipoises measured in the same manner.

11. A process for the manufacture of a resin syrup which comprises heating 1 mol of urea with 2 to 3 mols of aqueous formaldehyde at an alkaline pH until reaction of said formaldehyde is substantially complete, and continuing the heating at an acid pH in the presence of sufficient of a water-soluble quaternary ammonium compound having one aldehyde-reactive $-NH_2$ group to form a hydrophilic colloidal cationic resin having a viscosity between about 100 and 1000 centipoises when measured at 45% solids and at 25° C.

12. A process for the manufacture of a resin syrup which comprises heating 1 mol of urea with 2 to 3 mols of aqueous formaldehyde at an alkaline pH until reaction of said formaldehyde is substantially complete, self-condensing the low molecular weight methylol urea thus formed at an acid pH until a resinous syrup is obtained having a viscosity of between 100 and 1000 centipoises when measured at 45% solids and 25° C., stopping the self-condensation by addition of alkali, and reacting the resinous syrup at a pH not below 7 with sufficient of a water-soluble quaternary ammonium compound having one aldehyde-reactive $-NH_2$ group to convert said syrup to hydrophilic cationic form.

13. A process for the manufacture of a resin syrup which comprises heating at an alkaline pH a mixture of 1 mol of urea with 2 to 3 mols of aqueous formaldehyde and from about 0.1 to 0.5 part by weight per part by weight of urea of a water-soluble quaternary ammonium salt having one aldehyde-reactive $-NH_2$ group until reaction of said formaldehyde is substantially complete, and continuing the heating at an acid pH to form a syrup having a viscosity between about 100 and 1000 centipoises when measured at 25° C. and 45% solids.

14. A hydrophilic cationic colloidal resin obtained by the process of claim 10.

15. A hydrophilic cationic colloidal resin obtained by the process of claim 12.

16. A hydrophilic cationic colloidal resin obtained by the process of claim 13.

17. A wet strength cellulosic web substantially composed of cellulosic fibers bonded together by a uniformly distributed content of between about 0.1% and 5%, based on the dry weight of the fibers, of a hydrophilic colloidal cationic thermosetting resin formed by acid reaction of a methylol urea with a water-soluble quaternary ammonium salt having one aldehyde-reactive $-NH_2$ group, said resin being in thermocured form.

References Cited in the file of this patent

UNITED STATES PATENTS

| | | |
|---|---|---|
| 2,343,090 | Smith | Feb. 29, 1944 |
| 2,601,598 | Daniel et al. | June 24, 1952 |
| 2,616,874 | Yost | Nov. 2, 1952 |
| 2,657,132 | Daniel et al. | Oct. 27, 1953 |
| 2,680,057 | Janes | June 1, 1954 |
| 2,683,134 | Davidson et al. | July 6, 1954 |
| 2,698,787 | Schiller et al. | Jan. 4, 1955 |
| 2,711,961 | Brunner | June 28, 1955 |
| 2,729,617 | Davidson | Jan. 3, 1956 |
| 2,765,229 | McLaughlin | Oct. 2, 1956 |

FOREIGN PATENTS

| | | |
|---|---|---|
| 154,890 | Australia | Jan. 25, 1954 |